(12) United States Patent
Kanta

(10) Patent No.: US 12,456,069 B2
(45) Date of Patent: Oct. 28, 2025

(54) MAPPING AN ERROR CODE WITH A QUBIT

(71) Applicant: Red Hat, Inc., Raleigh, NC (US)

(72) Inventor: Srinivasa Bharath Kanta, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 141 days.

(21) Appl. No.: 18/447,666

(22) Filed: Aug. 10, 2023

(65) Prior Publication Data

US 2025/0053847 A1    Feb. 13, 2025

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS

| | | | |
|---|---|---|---|
| 9,301,185 B1 | 3/2016 | Koller et al. | |
| 11,736,122 B1 * | 8/2023 | Yoder | H03M 13/1125 714/755 |
| 11,748,652 B1 * | 9/2023 | Kubica | G06N 10/70 714/785 |
| 11,966,817 B1 * | 4/2024 | Shutty | G06N 10/00 |
| 2020/0326977 A1 * | 10/2020 | Gambetta | G06F 9/4881 |
| 2020/0394546 A1 * | 12/2020 | Bronn | G06N 10/40 |
| 2021/0099201 A1 * | 4/2021 | Winick | G06N 10/20 |
| 2021/0133613 A1 * | 5/2021 | Woerner | G06N 10/60 |
| 2021/0152189 A1 * | 5/2021 | Murali | G06N 10/20 |
| 2021/0194507 A1 * | 6/2021 | Delfosse | G06N 10/70 |
| 2021/0319478 A1 * | 10/2021 | Dejardins | G06T 19/006 |
| 2023/0176935 A1 * | 6/2023 | Earnest-Noble | G06N 10/20 714/47.2 |
| 2024/0020569 A1 * | 1/2024 | Inoue | G06N 10/20 |
| 2024/0062093 A1 * | 2/2024 | Wang | G06N 10/70 |
| 2024/0078088 A1 * | 3/2024 | Naveh | G06F 8/24 |

OTHER PUBLICATIONS

Jazaeri, Farzan, et al., "A Review on Quantum Computing: Qubits, Cryogenic Electronics and Cryogenic MOSFET Physics," arXiv:1908.02656v1 [quant-ph], https://doi.org/10.48550/arXiv.1908.02656, Aug. 7, 2019, 12 pages.

(Continued)

*Primary Examiner* — Mujtaba M Chaudry
(74) *Attorney, Agent, or Firm* — Dority & Manning, P.A.

(57) ABSTRACT

A quantum computing device determines that a first error occurred during an execution of quantum software. The quantum computing device obtains, based on the first error, a first error code from a first data structure comprising error codes associated with the quantum software and errors that occur with the quantum software. The quantum computing device maps the first error code to a first qubit state. The quantum computing device sends a response comprising the first qubit state.

20 Claims, 10 Drawing Sheets

(56) References Cited

OTHER PUBLICATIONS

Sypien, Julia, "Analysis of Quantum Error Correction Applicability on IBM-Q," Master of Science Thesis, AGH University of Science and Technology, Department of Computer Science, Krakow, Poland, http://dice.cyfronet.pl/publications/filters/filter_MSc_Theses/source/MSc_theses/Julia_Sypien_msc, May 19, 2020, 77 pages.
Sypien, Julia, "Analysis of Quantum Error Correction Applicability on IBM-Q," Slide Deck Accompanying Master of Science Thesis, AGH University of Science and Technology, Department of Computer Science, Krakow, Poland, 2020, 41 pages.
Zhou, Boyo, "Quantum Error Correction Codes," Computer Science, Physics, https://wp.optics.arizona.edu/opti646/wp-content/uploads/sites/55/2020/12/QECC_Boyu_Zhou.pdf, Dec. 6, 2020, 6 pages.
Extended European Search Report for European Patent Application No. 23209913.5, dated Apr. 29, 2024, 8 pages.

* cited by examiner

MAPPING AN ERROR CODE WITH A QUBIT

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to represent error codes will be desirable.

SUMMARY

The examples disclosed herein implement an error code mapping service that performs mapping an error code to a qubit. In particular, the error code mapping service can represent an error code by using a single qubit. The error code mapping service can determine that an error occurred during the execution of a quantum program and obtain information from a data structure that can be used to map the error code associated with the error to a qubit. The error code can be mapped to the qubit by calculating a qubit state based on the data obtained from the data structure.

In one example, a method for mapping an error code to a qubit is disclosed. The method includes determining, by a quantum computing device, that a first error occurred during an execution of quantum software. The method further includes obtaining, by the quantum computing device based on the first error, a first error code from a first data structure comprising error codes associated with the quantum software and errors that occur with the quantum software. The method further includes mapping, by the quantum computing device, the first error code to a first qubit state. The method further includes sending, by the quantum computing device, a response comprising the first qubit state.

In another example, a quantum computing device for mapping an error code to a qubit is disclosed. The quantum computing device comprises a system memory, and a processor device communicatively coupled to the system memory. The processor device is to determine that a first error occurred during an execution of quantum software. The processor device is further to obtain, based on the first error, a first error code from a first data structure comprising error codes associated with the quantum software and errors that occur with the quantum software. The processor device is further to map the first error code to a first qubit state. The processor device is further to send a response comprising the first qubit state.

In another example, a non-transitory computer-readable storage medium for mapping an error code to a qubit is disclosed. The non-transitory computer-readable storage medium stores thereon computer-executable instructions that, when executed, cause one or more processor devices to determine that a first error occurred during an execution of quantum software. The instructions further cause the processor device to obtain, based on the first error, a first error code from a first data structure comprising error codes associated with the quantum software and errors that occur with the quantum software. The instructions further cause the processor device to map the first error code to a first qubit state. The instructions further cause the processor device to send a response comprising the first qubit state.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
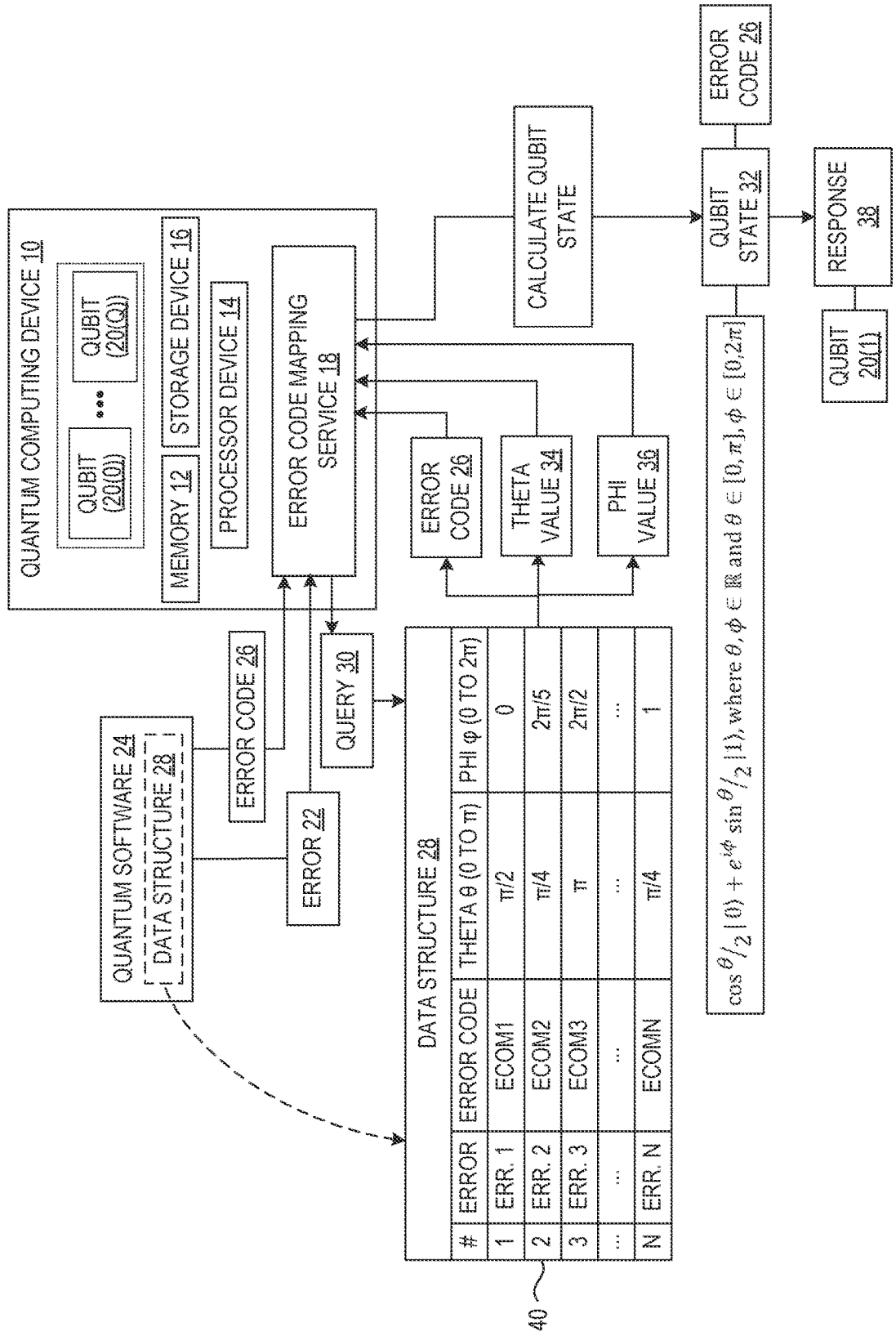
FIG. 1 is a block diagram of a quantum computing device in which examples of mapping an error code to a qubit may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

An error code, response code, or status code may be used by a computer program to determine the nature of an error, response, or status and why it occurred. In classical computing, the code is represented by more than one bit. For instance, a 404 error code for "Page Not Found" may require 9 bits in order to be represented. Other codes may be represented by many qubits, particularly when the error code is alphanumeric. Providing error codes, response codes, and status codes to a user of the computer program when the code is represented with many bits requires more memory, processing, and time, as more bits are required to send the code to the user.

The examples disclosed herein implement an error code mapping service that performs mapping an error code to a qubit. In particular, the error code mapping service can represent an error code by using a single qubit. The single qubit can be used for a number of codes, such as error codes, response codes, or status codes, instead of the many bits that are traditionally required to represent the codes. The properties of a qubit can be used by the error code mapping service to represent an error code using a single qubit.

The error code mapping service can determine that an error occurred during the execution of a quantum program and obtain information from a data structure that can be used to map the error code associated with the error to a qubit state. The error code can be mapped to the qubit state by calculating a qubit state based on the information obtained from the data structure and an equation that represents the qubit state. As a result, the error code can be represented as a single qubit with the calculated qubit state, instead of the multiple bits required for a classical computer, the error code sent to a user can be a single qubit instead of multiple bits, and less memory, processing, and time are required to send the error code.

In some examples, the error code mapping service can determine that another error occurred during the execution of the quantum program and obtain information from the data structure that can be used to map the error code associated with the new error to another qubit state. When an update to the quantum program is performed and an updated data structure is provided, the error code mapping service can use the updated data structure to obtain the information for mapping an error code to a qubit state for a single qubit when an error occurs during the execution of the updated quantum program.

FIG. 1 is a block diagram of a quantum computing device 10 that comprises a system memory 12, a processor device 14, and a storage device 16. It is to be understood that the quantum computing device 10 in some examples may include constituent elements in addition to those illustrated in FIG. 1. In the example of FIG. 1, the quantum computing device 10 implements an error code mapping service 18 that performs mapping an error code to a qubit.

In the example of FIG. 1, the quantum computing device 10 implements a set of one or more qubits 20(0)-20(Q) for use by quantum services executed by the quantum computing device 10. To maintain information for the qubit(s) 20(0)-20(Q), the quantum computing device 10 includes a qubit registry (not shown), which comprises a plurality of qubit registry entries each corresponding to a qubit such as the one or more qubits 20(0)-20(Q). The qubit registry maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries of the qubit registry also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing device 10 of FIG. 1 executes one or more quantum services. The quantum services are processes that employ qubits, such as the one or more qubits 20(0)-20(Q), to provide desired functionality. Execution of quantum services can be facilitated by a quantum service manager and a quantum service scheduler. The quantum service manager of the quantum computing device 10 handles operations for creating, monitoring, and terminating quantum services, while the quantum service scheduler of the quantum computing device 10 controls the scheduling of quantum services for execution by the processor device 14, and allocation of processing resources to executing quantum services. The functionality of the quantum service manager and the quantum service scheduler may be made accessible to other processes (e.g., via a defined application programming interface (API), as a non-limiting example).

The error code mapping service 18 may determine that a first error 22 occurred during an execution of quantum software 24 running on a quantum computing device, such as the quantum computing device 10 or another quantum computing device in a quantum computing system. For instance, the error code mapping service 18 may determine that the first error 22 occurred when the error code mapping service 18 receives a message, an error code, or another type of notification from the quantum software 24 or another component of the quantum computing device running the quantum software 24. While the quantum software 24 is described as software, the quantum software 24 may be a quantum service, web service, quantum firmware, or another program of a quantum computing device in some implementations.

The error code mapping service 18 can obtain a first error code 26 from a first data structure 28 based on the first error 22. The first data structure 28 can include error codes that are associated with the quantum software 24 and the errors that can occur with the quantum software 24. The first data structure 28 may be packaged with the quantum software 24. For instance, a developer of the quantum software 24 may define the error codes for the errors that can occur with the quantum software 24 and create the first data structure 28 to be packaged with the quantum software 24 for the error code mapping service 18 to use when mapping an error code to a qubit. In other examples, the first data structure 28 may be stored in a storage device, such as a database, of a computing system for use by the error code mapping service 18. The first data structure 28 may be a table, a graph, a tree, or another type of data structure. In some implementations, the error code mapping service 18 may obtain the first error code 26 from the first data structure 28 by obtaining the first error 22 that occurred during the execution of the quantum software 24 and sending a query 30 to the first data structure 28 with the first error 22. The error code mapping service 18 may then receive the first error code 26 from the first data structure 28 based on the query 30 with the first error 22. For example, the first data structure 28 may be a table that includes rows for each error that can occur with the quantum software and the error code that corresponds to the error, and the error code mapping service 18 can send a query 30 that includes the first error 22 in order to receive the corresponding first error code 26.

The error code mapping service 18 can map the first error code 26 to a first qubit state 32. The first qubit state 32 represents the state that a qubit is in, such as state $|0\rangle$ or $|1\rangle$ or a combination of both states (i.e., a superposition state). For instance, when a qubit is represented with a Bloch sphere, the north pole is $|0\rangle$ and the south pole is $|1\rangle$. Theta ($\theta$) values and phi ($\phi$) values can be used as the spherical coordinates of a qubit, such as in the Bloch sphere representation of a qubit. Based on the theta value and the phi value, the qubit state will change. For instance, the co-ordinates of a qubit may be $r_x = r \sin \theta \cos \phi$, $r_y = r \sin \theta \sin \phi$, and $r_z = r \cos \theta$, so the co-ordinates of the qubit will change based on the theta value and the phi value. The theta values and the phi values are real numbers, therefore there can be an infinite number of combinations to calculate the state of a qubit, allowing for an infinite number of error codes to be available. As a result, the error code mapping service 18 can map the error codes of the quantum software 24 uniquely by using theta values and phi values to determine a state for a single qubit.

The error code mapping service 18 may map the first error code 26 to the first qubit state 32 by obtaining a theta value 34 and a phi value 36 from the first data structure 28 based on the first error code 26. For example, the first data structure 28 may be a table that includes rows for each error that can occur with the quantum software 24, the rows including the error code, a theta value, and a phi value that correspond to the error. The error code mapping service 18 can send a query 30 that includes the first error 22 or the first error code 26 in order to obtain the theta value 34 and the phi value 36 that correspond to the first error 22 and the first error code 26 in a row of the first data structure 28. The theta value 34 may be a real number between 0 and $\pi$ and the phi value 36 may be a real number between 0 and $2\pi$. In implementations where a developer of the quantum software 24 creates the first data structure 28, the developer may define the theta value and the phi value to assign to each error code in the first data structure 28 that is packaged with the quantum software 24 for the error code mapping service 18 to use when mapping an error code to a qubit. The error code mapping service 18 can then calculate the first qubit state 32 based on the theta value 34 and the phi value 36. For instance, the error code mapping service 18 can use an equation that represents a qubit state, such as $\cos \theta/2 |0\rangle + e^{i\phi} \sin \theta/2 |1\rangle$, to calculate the first qubit state 32 for the first error code 26 by solving the equation with the theta value 34 and the phi value 36 obtained from the first data structure 28 based on the first error code 26.

In some implementations, the error code mapping service 18 may determine that the error occurred by receiving the first error code 26 from the quantum software 24. The error code mapping service 18 can then use the first error code 26 to obtain the theta value 34 and the phi value 36 from the first data structure 28, such as by sending the query 30 with the first error code 26 to the first data structure 28 and receiving the theta value 34 and the phi value 36 in return from the first data structure 28, and map the first error code 26 to the first qubit state 32 by calculating the first qubit state 32 with the theta value 34 and the phi value 36.

The error code mapping service 18 can send a response 38 comprising the first qubit state 32, which is the qubit state for a single qubit (e.g., qubit 20(1)), to the quantum computing device 10 or another computing device. The response 38 can be the first error code 26, a response code, a status code, or another code represented as the single qubit (e.g., the qubit 20(1)), instead of the multiple bits required for a classical computer. In some examples, the error code mapping service 18 can send a response 38 comprising the single qubit (e.g., the qubit 20(1)) with the first qubit state 32. The response 38 can be sent to a user of the quantum software 24, so the user can receive a single qubit that represents the first error code 26. The response 38 may be a message, a notification, or an API response, as non-limiting examples.

In some examples, the first data structure 28 may be a table with columns for an index, errors, error codes, theta values, and phi values, and rows for each error that includes the index, error, error code, theta value, and phi value for the error. For example, the error code mapping service 18 may determine that "Error 2" (e.g., the first error 22, such as an I/O error) occurred during the execution of the quantum software 24. The error code mapping service 18 may obtain the first error code 26 from the first data structure 28 based on the error "Error 2" (e.g., the first error 22), such as by sending the query 30 to the first data structure 28 with the error "Error 2" and receiving the "ECOM2" error code (e.g., the first error code 26) from the first data structure 28 because a row 40 of the first data structure 28 identifies "Error 2" as having the "ECOM2" error code. The error code mapping service 18 can map the "ECOM2" error code (e.g., the first error code 26) to a qubit state by obtaining the theta value 34 and the phi value 36 from the row 40 of the first data structure 28 which identifies the "ECOM2" error code as having a theta value of $\pi/4$ and a phi value of $2\pi/5$. The first qubit state 32 for the "ECOM2" error code (e.g., the first error code 26) can then be calculated by inputting the theta value of $\pi/4$ and the phi value of $2\pi/5$ into an equation that represents a qubit state, such as $\cos \theta/2 |0\rangle + e^{i\phi} \sin \theta/2 |1\rangle$, where $\theta, \phi \in \mathbb{R}$ and $\theta \in [0, \pi]$, $\phi \in [0, 2\pi]$, with the result of the calculation being the first qubit state 32 for the "ECOM2" error code. The error code mapping service 18 can send the response 38 comprising the first qubit state 32 for the "ECOM2" error code as a single qubit (e.g., the qubit 20(1)) to the quantum computing device 10 or another computing device. As a result, the "ECOM2" error code can be represented as a single qubit with the calculated qubit state.

While the first error code 26 is described as an error code based on the first error 22, the first error code 26 may be a response code, a status code, or another code associated with the quantum software 24. For instance, the first data structure 28 may include error codes, response codes, and/or status codes associated with the quantum software 24 and errors, responses, and statuses of the quantum software 24. The error code mapping service 18 can determine that a response or a status should be sent (e.g., to a computing device or a user), obtain the response code or the status code from the first data structure 28, map the response code or the status code to a first qubit state 32 by obtaining a theta value 34 and a phi value 36 from the first data structure 28 based on the response code or the status code to input into an equation that represents a qubit state in order to calculate the first qubit state 32 for the response code or the status code, and send a response 38 comprising the first qubit state 32, which is the qubit state for a single qubit, and/or the single qubit with the first qubit state 32.

It is to be understood that, because the error code mapping service 18 is a component of the quantum computing device 10, functionality implemented by the error code mapping service 18 may be attributed to the quantum computing device 10 generally. Moreover, in examples where the error code mapping service 18 comprises software instructions that program the processor device 14 to carry out functionality discussed herein, functionality implemented by the error code mapping service 18 may be attributed herein to the processor device 14. It is to be further understood that while, for purposes of illustration only, the error code mapping service 18 is depicted as a single component, the functionality implemented by the error code mapping service 18 may be implemented in any number of components, and the examples discussed herein are not limited to any particular number of components.

Figure 2:
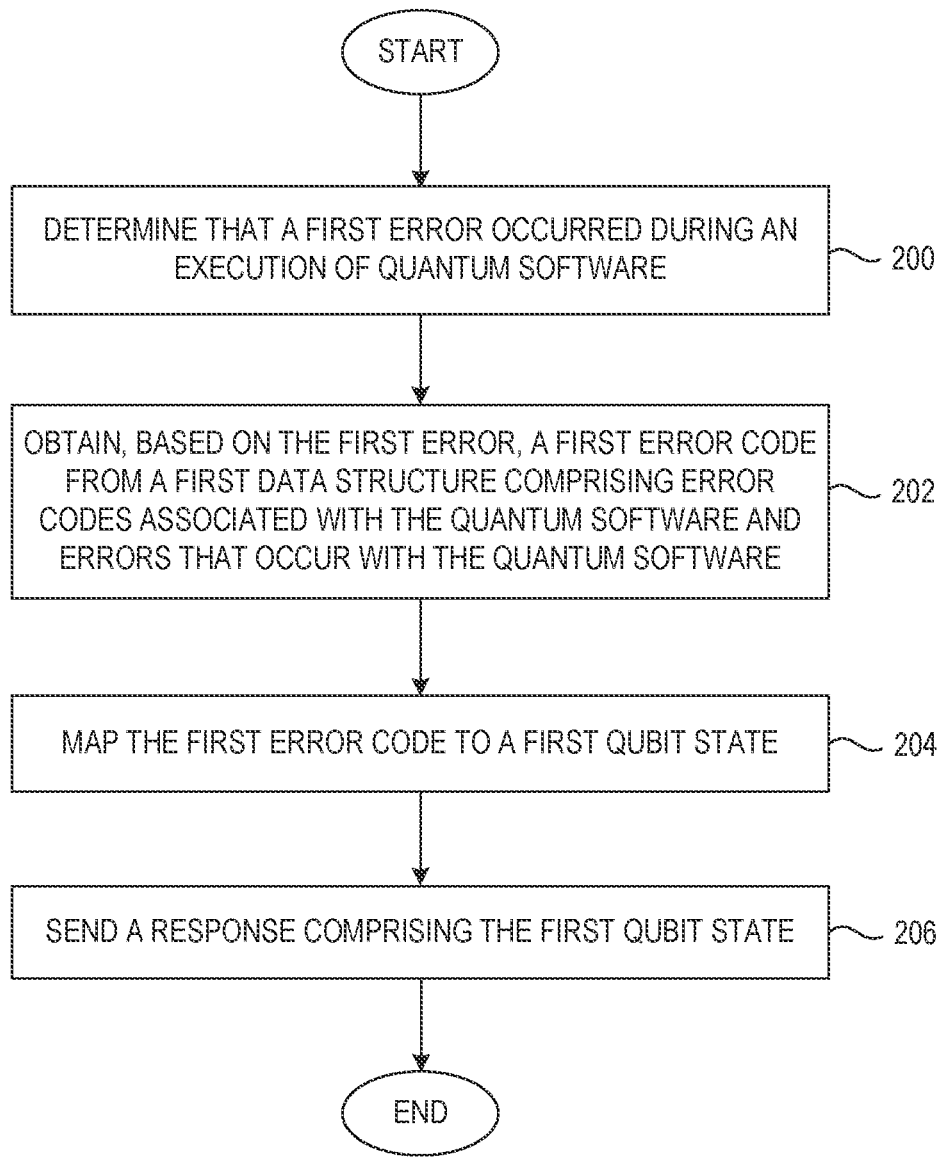
FIG. 2 is a flowchart illustrating operations performed by the quantum computing device of FIG. 1 for mapping an error code to a qubit, according to one example.

FIG. 2 is a flowchart illustrating operations performed by the quantum computing device of FIG. 1 for mapping an error code to a qubit, according to one example. Elements of FIG. 1 are referenced in describing FIG. 2 for the sake of clarity. In the example of FIG. 2, operations begin with a processor device of a quantum computing device, such as the processor device 14 of the quantum computing device 10 of FIG. 1, the processor device to determine that a first error occurred during an execution of quantum software (block 200). The processor device is further to obtain, based on the first error, a first error code from a first data structure comprising error codes associated with the quantum software and errors that occur with the quantum software (block 202). The processor device is further to map the first error code to a first qubit state (block 204). The processor device is further to send a response comprising the first qubit state (block 206).

Figure 3:
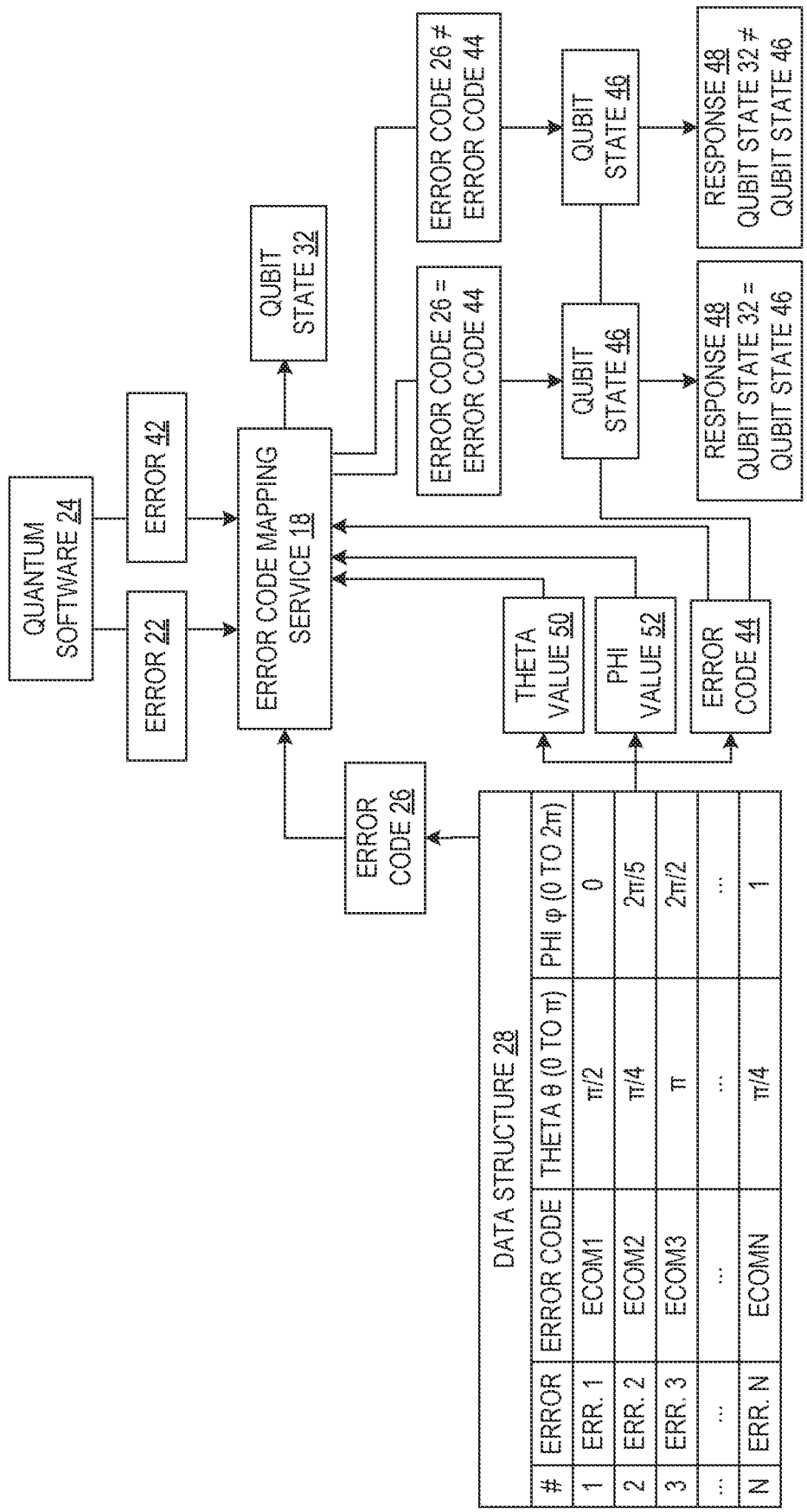
FIG. 3 is a block diagram of the quantum computing device of FIG. 1 for mapping an error code to a qubit, according to one example.

FIG. 3 is a block diagram of the quantum computing device of FIG. 1 for mapping an error code to a qubit, according to one example. Elements of FIG. 1 are referenced in describing FIG. 3 for the sake of clarity. In the example of FIG. 3, the error code mapping service 18 may determine that a second error 42 occurred during the execution of the quantum software 24. For instance, the error code mapping service 18 may determine that the second error 42 occurred when the error code mapping service 18 receives a message, an error code, or another type of notification from the quantum software 24 or another component of the quantum computing device running the quantum software 24.

The error code mapping service 18 can obtain a second error code 44 from the first data structure 28 based on the second error 42. In some implementations, the error code mapping service 18 may obtain the second error code 44 from the first data structure 28 by obtaining the second error 42 that occurred during the execution of the quantum software 24 and sending a query to the first data structure 28 with the second error 42. The error code mapping service 18 may then receive the second error code 44 from the first data structure 28 based on the query with the second error 42.

In some examples, the second error code 44 associated with the second error 42 may be different from the first error code 26 associated with the first error 22. The error code mapping service 18 may map the second error code 44 to a second qubit state 46. The error code mapping service 18 can map the second error code 44 to the second qubit state 46 by obtaining a second theta value 50 and a second phi value 52 from the first data structure 28, the second theta value 50 and the second phi value 52 being the values that correspond to the second error code 44. The second theta value 50 may be a real number between 0 and $\pi$ and the second phi value 52 may be a real number between 0 and $2\pi$. The second theta value 50 and the second phi value 52 that correspond to the second error code 44 can be obtained, for example, when the error code mapping service 18 sends a query that includes the second error 42 or the second error code 44 to the first data structure 28 in order to receive the second theta value 50 and the second phi value 52 for the second error 42 or the second error code 44 in return from the first data structure 28.

The error code mapping service 18 can then calculate a second qubit state 46 based on the second theta value 50 and the second phi value 52, such as by inputting the second theta value 50 and the second phi value 52 into an equation that represents a qubit state (e.g., $\cos \theta/2|0\rangle + e^{i\phi} \sin \theta/2|1\rangle$, where $\theta, \phi \in \mathbb{R}$ and $\theta \in [0, \pi]$, $\phi \in [0, 2\pi]$), to calculate the second qubit state 46 for the second error code 44. The second qubit state 46 can differ from the first qubit state 32 when the second error code 44 is different from the first error code 26, which results in a different theta value and a different phi value being pulled from the first data structure 28 and input into the equation for the second error code 44 than the theta value and the phi value that were pulled from the first data structure 28 and input into the equation for the first error code 26. For example, the first error code 26 may be the "ECOM1" error code in a first row of the first data structure 28, which has a theta value of $\pi/2$ and a phi value of 0, and the second error code 44 may be the "ECOM2" error code in a second row of the first data structure 28, which has a theta value of $\pi/4$ and a phi value of $2\pi/5$, so the calculations of the first qubit state 32 and the second qubit state 46 with the $\cos \theta/2|0\rangle + e^{i\phi} \sin \theta/2|1\rangle$ equation result in different values. The error code mapping service 18 can send a response 48 comprising the second qubit state 46, which is the qubit state for a single qubit, to the quantum computing device 10 or another computing device. In some examples, the error code mapping service 18 can send a response 48 comprising the single qubit with the second qubit state 46. The response 48 can be sent to a user of the quantum software 24, so the user can receive a single qubit that represents the second error code 44. The response 48 may be a message, a notification, or an API response, as non-limiting examples.

In another example, the second error code 44 associated with the second error 42 may be identical to the first error code 26 associated with the first error 22. The error code mapping service 18 may map the second error code 44 to a second qubit state 46. The error code mapping service 18 can map the second error code 44 to the second qubit state 46 by obtaining a second theta value 50 and a second phi value 52 from the first data structure 28, the second theta value 50 and the second phi value 52 being the values that correspond to the second error code 44. The second theta value 50 may be a real number between 0 and $\pi$ and the second phi value 52 may be a real number between 0 and $2\pi$. The second theta value 50 and the second phi value 52 that correspond to the second error code 44 can be obtained, for example, when the error code mapping service 18 sends a query to the first data structure 28 that includes the second error 42 or the second error code 44 in order to receive the second theta value 50 and the second phi value 52 for the second error 42 or the second error code 44 in return from the first data structure 28.

The error code mapping service 18 can then calculate a second qubit state 46 based on the second theta value 50 and the second phi value 52, such as inputting the second theta value 50 and the second phi value 52 into an equation that represents a qubit state (e.g., $\cos \theta/2|0\rangle + e^{i\phi} \sin \theta/2|1\rangle$, where $\theta, \phi \in \mathbb{R}$ and $\theta \in [0, \pi]$, $\phi \in [0, 2\pi]$), to calculate the second qubit state 46 for the second error code 44. The second qubit state 46 can be identical to the first qubit state 32 when the second error code 44 is identical to the first error code 26, which results in the same theta value and the same phi value being pulled from the first data structure 28 and input into the equation for the second error code 44 and for the first error code 26. For example, the first error code 26 may be the "ECOM1" error code in a first row of the first data structure 28 and the second error code 44 may also be the "ECOM1" error code in the first row of the first data structure 28, so the same theta value of $\pi/2$ and the same phi value of 0 are used in the calculations of the first qubit state 32 and the second qubit state 46 with the $\cos \theta/2|0\rangle + e^{i\phi} \sin \theta/2|1\rangle$ equation, resulting in the same values. The error code mapping service 18 can send a response 48 comprising the second qubit state 46, which is the qubit state for a single qubit, to the quantum computing device 10 or another computing device. In some examples, the error code mapping service 18 can send a response 48 comprising the single qubit with the second qubit state 46. The response 48 can be sent to a user of the quantum software 24, so the user can receive a single qubit that represents the second error code 44. The response 48 may be a message, a notification, or an API response, as non-limiting examples.

While the second error code 44 is described as an error code based on the second error 42, the second error code 44 may be a response code, a status code, or another code associated with the quantum software 24. For instance, the first data structure 28 may include error codes, response codes, and/or status codes associated with the quantum software 24 and errors, responses, and statuses of the quantum software 24. The error code mapping service 18 can determine that a second response or a second status should be sent (e.g., to a computing device or a user) after a first response or a first status was sent, obtain the second response code or the second status code from the first data structure 28, map the second response code or the second status code to a second qubit state 46 by obtaining a second theta value 50 and a second phi value 52 from the first data structure 28 based on the second response code or the second status code to input into an equation that represents a qubit state in order to calculate the second qubit state 46 for the second response code or the second status code, and send a response 48 comprising the second qubit state 46, which is the qubit state for a single qubit, and/or the single qubit with the second qubit state 46.

Figure 4:
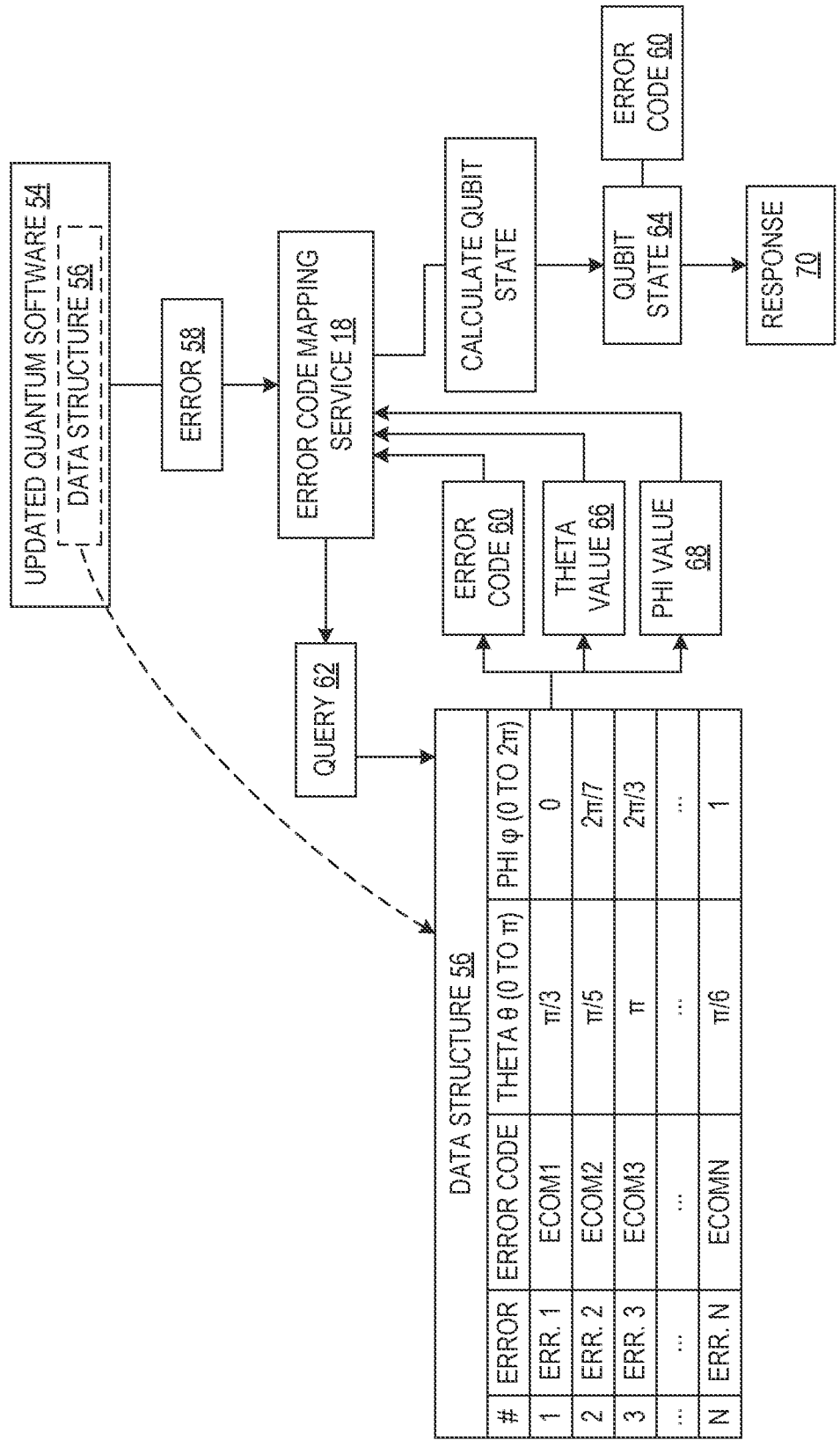
FIG. 4 is a block diagram of the quantum computing device of FIG. 1 for mapping an error code to a qubit, according to one example.

FIG. 4 is a block diagram of the quantum computing device of FIG. 1 for mapping an error code to a qubit, according to one example. Elements of FIG. 1 are referenced in describing FIG. 4 for the sake of clarity. In the example of FIG. 4, the error code mapping service 18 may determine that the quantum software 24 has been updated to a new version of the quantum software. While the updated quantum software 54 is described as software, the updated quantum software 54 may be a quantum service, quantum firmware, or another program of a quantum computer in some implementations. The updated quantum software 54 may include a second data structure 56 that has been packaged with the updated quantum software 54. The second data structure 56 can include error codes that are associated with the updated quantum software 54 and the errors that can occur with the updated quantum software 54. For instance, a developer of the updated quantum software 54 may define the error codes for the errors that can occur with the updated quantum software 54 and create the second data structure 56 to be packaged with the updated quantum software 54 for the error code mapping service 18 to use. In other examples, the second data structure 56 may be stored in a storage device, such as a database, of a computing system for use by the error code mapping service 18. The second data structure 56 may be a table, a graph, a tree, or another type of data structure. In some examples, the first data structure 28 may be updated with additional or different errors, error codes, and values provided by the updated quantum software 54. An infinite number of error codes are available because the theta values and the phi values are real numbers, so the first data structure 28 can be updated with as many additional errors, error codes, theta values, and phi values as needed for the updated quantum software 54. In examples where the first data structure 28 is updated, the functionality implemented by the second data structure 56 may be attributed to the updated first data structure 28.

The error code mapping service 18 may determine that an error 58 occurred during an execution of the updated quantum software 54. For instance, the error code mapping service 18 may determine that the error 58 occurred when the error code mapping service 18 receives a message, an error code, or another type of notification from the updated quantum software 54 or another component of the quantum computing device running the updated quantum software 54. The error code mapping service 18 can obtain an error code 60 from the second data structure 56 based on the error 58. In some implementations, the error code mapping service 18 may obtain the error code 60 from the second data structure 56 by obtaining the error 58 that occurred during the execution of the updated quantum software 54 and sending a query 62 to the second data structure 56 with the error 58. The error code mapping service 18 may then receive the error code 60 from the second data structure 56 based on the query 62 with the error 58.

The error code mapping service 18 can map the error code 60 to a qubit state 64. The error code mapping service 18 may map the error code 60 to the qubit state 64 by obtaining a theta value 66 and a phi value 68 from the second data structure 56 based on the error code 60. For example, the second data structure 56 may be a table that includes rows for each error that can occur with the updated quantum software 54, the rows including the error code, a theta value, and a phi value that correspond to the error. The error code mapping service 18 can send a query 62 that includes the error 58 or the error code 60 in order to obtain the theta value 66 and the phi value 68 that correspond to the error 58 and the error code 60 from the second data structure 56. The theta value 66 may be a real number between 0 and $\pi$ and the phi value 68 may be a real number between 0 and $2\pi$. In implementations where a developer of the updated quantum software 54 creates the second data structure 56, the developer may define the theta value and the phi value to assign to each error code in the second data structure 56 that is packaged with the updated quantum software 54 for the error code mapping service 18 to use The error code mapping service 18 can then calculate the qubit state 64 based on the theta value 66 and the phi value 68, such as by inputting the theta value 66 and the phi value 68 into an equation that represents a qubit state (e.g., $\cos \theta/2|0\rangle + e^{i\phi} \sin \theta/2|1\rangle$, where $\theta, \phi \in \mathbb{R}$ and $\theta \in [0, \pi]$, $\theta \in [0, 2\pi]$), to calculate the qubit state 64 for the error code 60. The error code mapping service 18 can send a response 70 comprising the qubit state 64, which is the qubit state for a single qubit, to the quantum computing device 10 or another computing device. In some examples, the error code mapping service 18 can send a response 70 comprising the single qubit with the qubit state 64. The response 70 can be sent to a user of the updated quantum software 54, so the user can receive a single qubit that represents the error code 60. The response 70 may be a message, a notification, or an API response, as non-limiting examples.

While the error code 60 is described as an error code based on the error 58, the error code 60 may be a response code, a status code, or another code associated with the updated quantum software 54. For instance, the second data structure 56 may include error codes, response codes, and/or status codes associated with the updated quantum software 54 and errors, responses, and statuses of the updated quantum software 54. The error code mapping service 18 can determine that a response or a status should be sent (e.g., to a computing device or a user), obtain the response code or the status code from the second data structure 56, map the response code or the status code to a qubit state 64 by obtaining a theta value 66 and a phi value 68 from the second data structure 56 based on the response code or the status code to input into an equation that represents a qubit state in order to calculate the qubit state 64 for the response code or the status code, and send a response 70 comprising the qubit state 64, which is the qubit state for a single qubit, and/or the single qubit with the qubit state 64.

Figure 5:
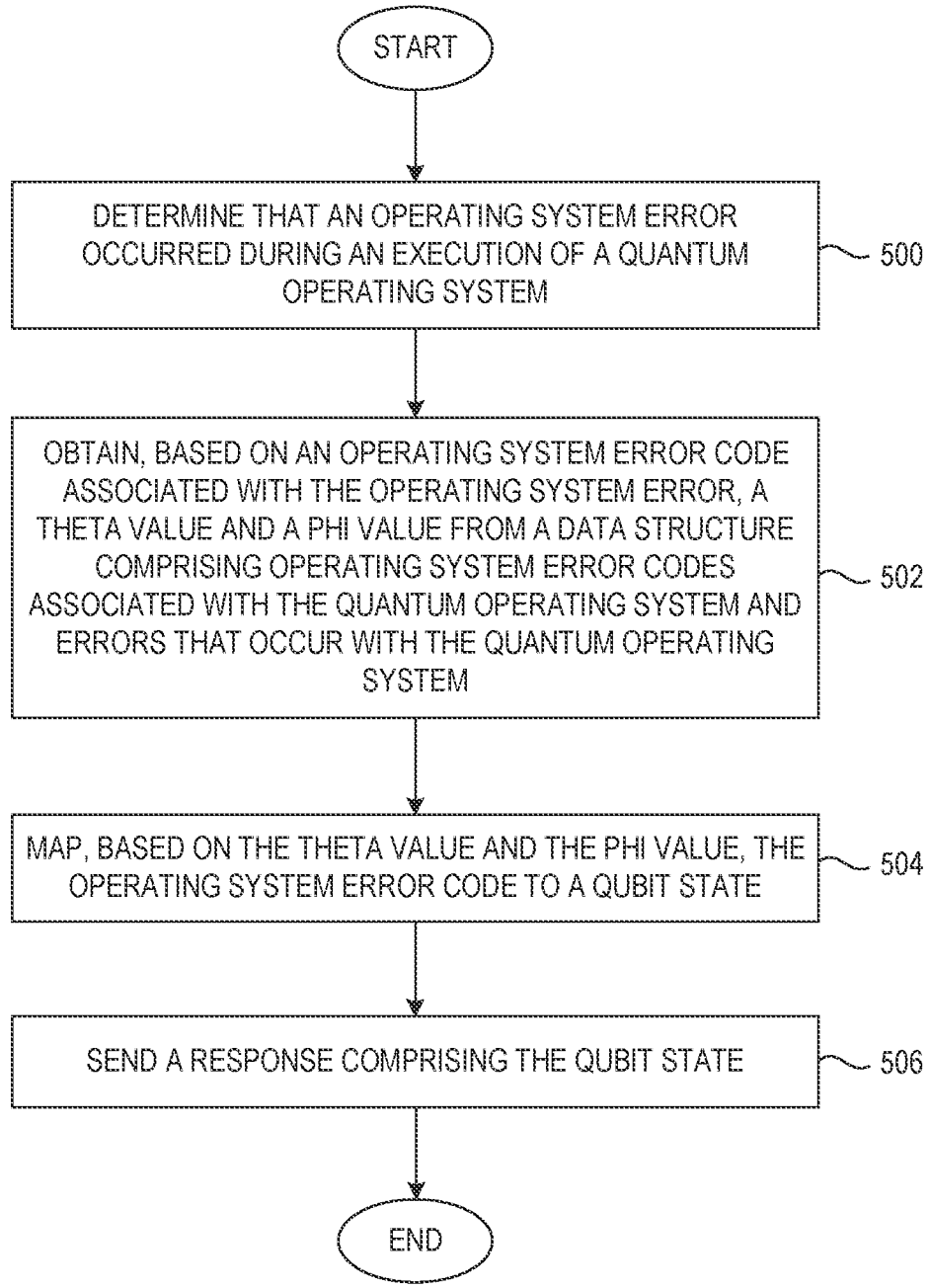
FIG. 5 is a flowchart illustrating operations performed by the quantum computing device of FIG. 1 for mapping an error code to a qubit, according to one example.

FIG. 5 is a flowchart illustrating operations performed by the quantum computing device of FIG. 1 for mapping an error code to a qubit, according to one example. Elements of FIG. 1 are referenced in describing FIG. 5 for the sake of clarity. In the example of FIG. 5, operations begin with a processor device of a quantum computing device, such as the processor device 14 of the quantum computing device 10 of FIG. 1, the processor device to determine that an operating system error occurred during an execution of a quantum operating system (block 500). The processor device is further to obtain, based on an operating system error code associated with the operating system error, a $\theta$ value and a $\phi$ value from a data structure comprising operating system error codes associated with the quantum operating system and errors that occur with the quantum operating system (block 502). The processor device is further to map, based on the $\theta$ value and the $\phi$ value, the operating system error code to a qubit state (block 504). The processor device is further to send a response comprising the qubit state (block 506).

Figure 6:
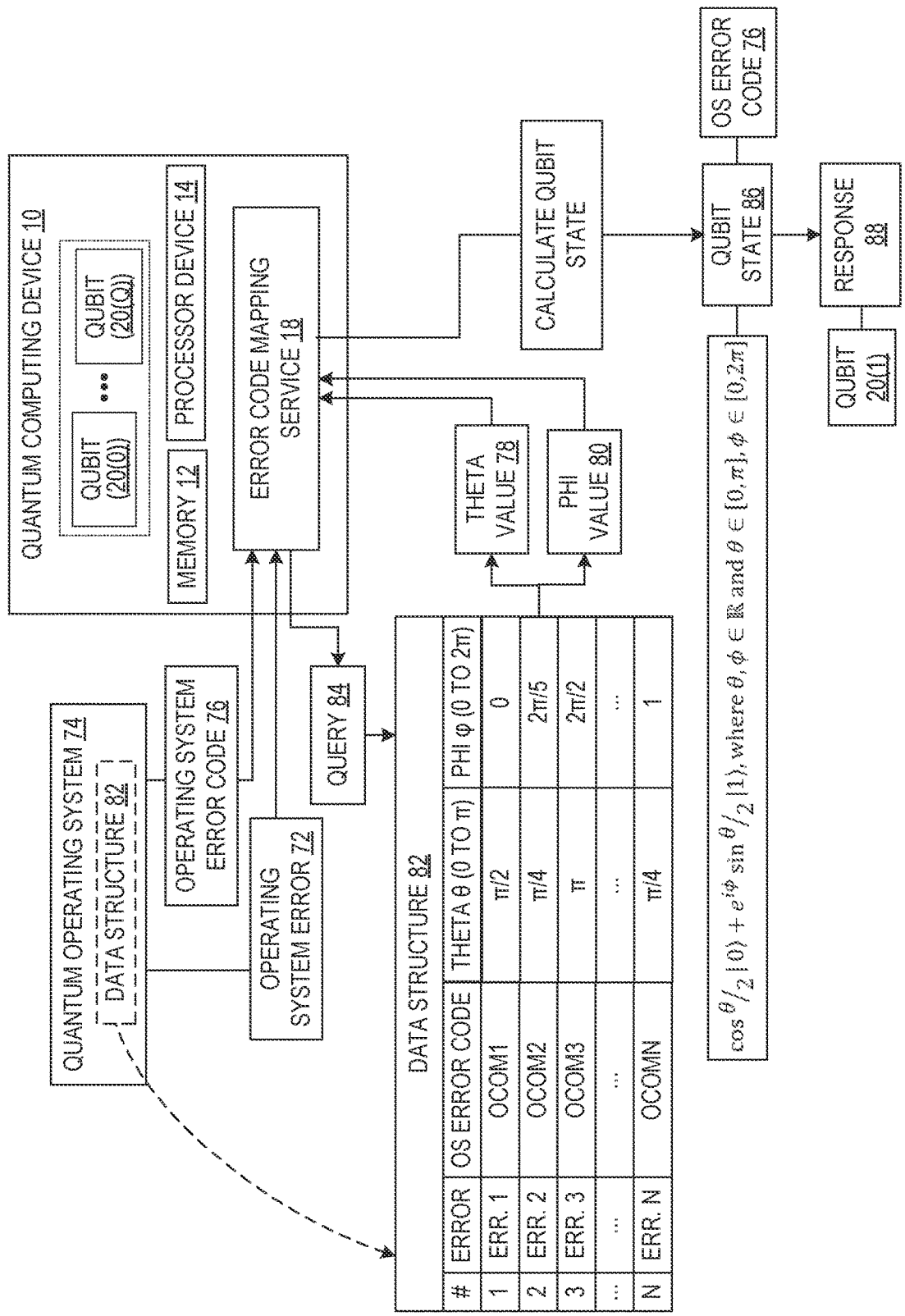
FIG. 6 is a block diagram of the quantum computing device of FIG. 1 for mapping an error code to a qubit, according to one example.

FIG. 6 is a block diagram of the quantum computing device of FIG. 1 for mapping an error code to a qubit, according to one example. Elements of FIG. 1 are referenced in describing FIG. 6 for the sake of clarity. In the example of FIG. 6, the error code mapping service 18 may determine that an operating system error 72 occurred during an execution of a quantum operating system 74. The quantum operating system 74 may be any operating system that can run quantum software (e.g., the quantum software 24) on quantum computing hardware (e.g., the quantum computing device 10). For instance, the error code mapping service 18 may determine that the operating system error 72 occurred when the error code mapping service 18 receives a message, an error code, or another type of notification from the quantum operating system 74 or another component of the quantum computing device utilizing the quantum operating system 74. In some implementations, the error code mapping service 18 may determine that the operating system error 72 occurred when the error code mapping service 18 receives an operating system error code 76 from the quantum operating system 74.

The error code mapping service 18 can obtain a theta value 78 and a phi value 80 from a data structure 82 based on the operating system error code 76 associated with the operating system error 72. The data structure 82 can include operating system error codes that are associated with the quantum operating system 74 and the errors that can occur with the quantum operating system 74, a theta value for each operating system error code, and a phi value for each operating system error code. The data structure 82 may be packaged with the quantum operating system 74. For instance, a developer of the quantum operating system 74 may define the operating system error codes for the operating system errors that can occur with the quantum operating system 74, and the theta value and the phi value to assign to each operating system error code in the data structure 82, and create the data structure 82 to be packaged with the quantum operating system 74 for the error code mapping service 18 to use when mapping an operating system error code to a qubit. In other examples, the data structure 82 may be stored in a storage device, such as a database, of a computing system for use by the error code mapping service 18. The data structure 82 may be a table, a graph, a tree, or another type of data structure.

In some implementations, the error code mapping service 18 may obtain the theta value 78 and the phi value 80 from the data structure 82 by sending a query 84 to the data structure 82 with the operating system error code 76. The error code mapping service 18 may then receive the theta value 78 and the phi value 80 from the data structure 82 based on the query 84 with the operating system error code 76. For example, the data structure 82 may be a table that includes rows for each operating system error that can occur with the quantum operating system, the rows including the operating system error code, a theta value, and a phi value that correspond to the operating system error. The error code mapping service 18 can send a query 84 that includes the operating system error code 76 in order to obtain the theta value 78 and the phi value 80 for the operating system error code 76 associated with the operating system error 72 from the data structure 82. The theta value 78 may be a real number between 0 and $\pi$ and the phi value 80 may be a real number between 0 and $2\pi$.

The error code mapping service 18 can map the operating system error code 76 to a qubit state 86 based on the theta value 78 and the phi value 80. The error code mapping service 18 may map the operating system error code 76 to the qubit state 86 by calculating the qubit state 86 with the theta value 78 and the phi value 80. For instance, the error code mapping service 18 can use an equation that represents a qubit state, such as $\cos\theta/2|0\rangle + e^{i\phi}\sin\theta/2|1\rangle$, to calculate the qubit state 86 for the operating system error code 76 by solving the equation with the theta value 78 and the phi value 80 obtained from the data structure 82 based on the operating system error code 76. The error code mapping service 18 can send a response 88 comprising the qubit state 86, which is the qubit state for a single qubit (e.g., the qubit 20(1)), to the quantum computing device 10 or another computing device. In some examples, the error code mapping service 18 can send a response 88 comprising the single qubit (e.g., the qubit 20(1)) with the qubit state 86. The response 88 can be sent to a user of the quantum operating system 74, so the user can receive a single qubit that represents the operating system error code 76. The response 88 may be a message, a notification, or an API response, as non-limiting examples.

While the operating system error code 76 is described as an error code based on the operating system error 72, the operating system error code 76 may be a response code, a status code, or another code associated with the quantum operating system 74. For instance, the data structure 82 may include operating system error codes, response codes, and/or status codes associated with the quantum operating system 74 and errors, responses, and statuses of the quantum operating system 74. The error code mapping service 18 can determine that a response or a status should be sent (e.g., to a computing device or a user), obtain a theta value 78 and a phi value 80 based on the response code or the status code from the data structure 82, map the response code or the status code to a qubit state 86 by inputting the theta value 78 and the phi value 80 into an equation that represents a qubit state in order to calculate the qubit state 86 for the response code or the status code, and send a response 88 comprising the qubit state 86, which is the qubit state for a single qubit, and/or the single qubit with the qubit state 86.

Figure 7:
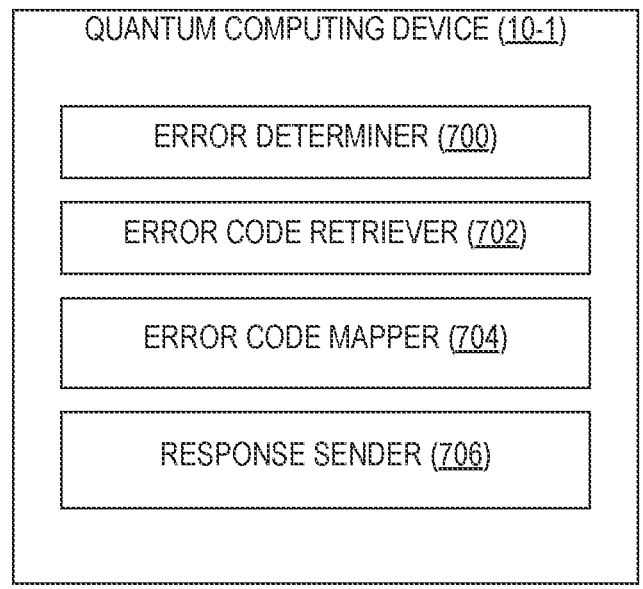
FIG. 7 is a block diagram of a quantum computing device suitable for implementing aspects illustrated in FIGS. 1-6 according to one example.

FIG. 7 is a block diagram of a quantum computing device 10-1 suitable for implementing aspects illustrated in FIGS. 1-6 according to one example. The quantum computing device 10-1 implements identical functionality as that described above with regard to the quantum computing device 10. The quantum computing device 10-1 includes an error determiner 700 to determine that a first error occurred during an execution of quantum software. In some implementations, the error determiner 700 determines that the first error occurred during the execution of the quantum software by receiving the first error code from the quantum software. The error determiner 700 may comprise executable software instructions configured to program a processor device to implement the functionality of determining that a first error occurred during an execution of quantum software, may comprise circuitry including, by way of non-limiting example, an application-specific integrated circuit (ASIC), field-programmable gate array (FPGA), or may comprise a combination of executable software instructions and circuitry.

The quantum computing device 10-1 also includes an error code retriever 702 to obtain, based on the first error, a first error code from a first data structure comprising error codes associated with the quantum software and errors that occur with the quantum software. In some implementations, the error code retriever 702 obtains, based on the first error, the first error code from the first data structure by obtaining the first error that occurred during the execution of the quantum software, querying the first data structure with the first error, and receiving the first error code from the first data structure based on the query with the first error. The error code retriever 702 may comprise executable software instructions configured to program a processor device to implement the functionality of obtaining, based on the first error, a first error code from a first data structure comprising error codes associated with the quantum software and errors that occur with the quantum software, may comprise circuitry including, by way of non-limiting example, an ASIC, FPGA, or may comprise a combination of executable software instructions and circuitry.

The quantum computing device 10-1 also includes an error code mapper 704 to map the first error code to a first qubit state. In some implementations, the error code mapper 704 maps the first error code to the first qubit state by obtaining a θ value and a φ value from the first data structure based on the first error code, wherein the θ value is a real number between 0 and π and the φ value is a real number between 0 and 2π, and calculating the first qubit state based on the θ value and the φ value. The error code mapper 704 may comprise executable software instructions configured to program a processor device to implement the functionality of mapping the first error code to a first qubit state, may comprise circuitry including, by way of non-limiting example, an ASIC, FPGA, or may comprise a combination of executable software instructions and circuitry.

The quantum computing device 10-1 also includes a response sender 706 to send a response comprising the first qubit state. The response sender 706 may comprise executable software instructions configured to program a processor device to implement the functionality of sending a response comprising the first qubit state, may comprise circuitry including, by way of non-limiting example, an ASIC, FPGA, or may comprise a combination of executable software instructions and circuitry.

Figure 8:
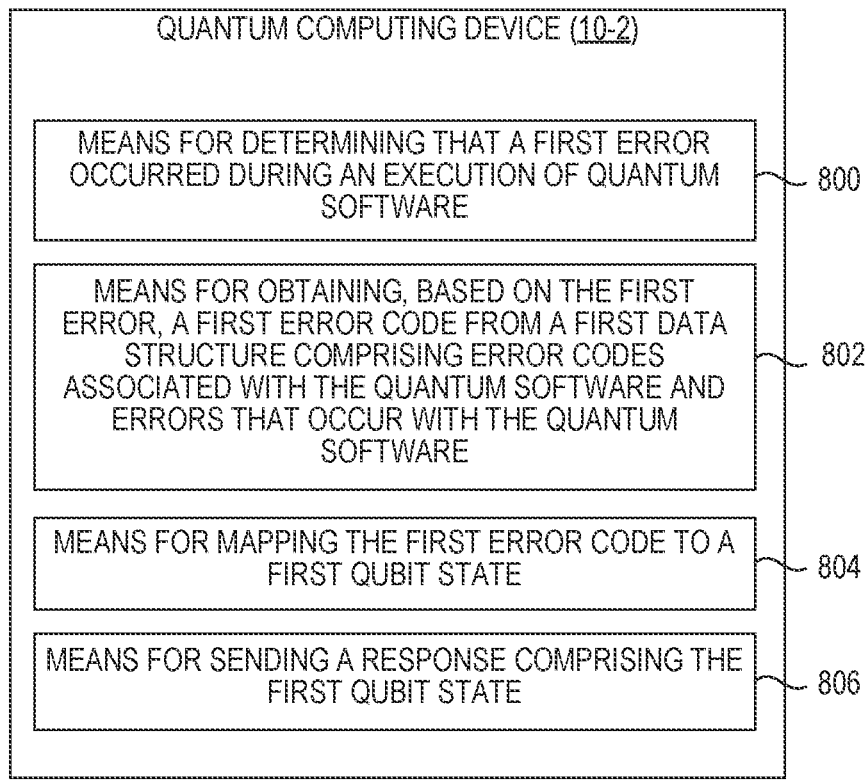
FIG. 8 is a block diagram of a quantum computing device suitable for mapping an error code to a qubit, according to one example.

FIG. 8 is a block diagram of a quantum computing device 10-2 suitable for mapping an error code to a qubit, according to one example. The quantum computing device 10-2 implements identical functionality as that described above with regard to the quantum computing device 10. In this implementation, the quantum computing device 10-2 includes a means 800 for determining that a first error occurred during an execution of quantum software. The means 800 may, in some implementations, receive the first error code from the quantum software. The means 800 may be implemented in any number of manners, including, for example via the error determiner 700 illustrated in FIG. 7.

The quantum computing device 10-2 also includes a means 802 for obtaining, based on the first error, a first error code from a first data structure comprising error codes associated with the quantum software and errors that occur with the quantum software. The means 802 may, in some implementations, obtain the first error that occurred during the execution of the quantum software, query the first data structure with the first error, and receive the first error code from the first data structure based on the query with the first error. The means 802 may be implemented in any number of manners, including, for example via the error code retriever 702 illustrated in FIG. 7.

The quantum computing device 10-2 also includes a means 804 for mapping the first error code to a first qubit state. The means 804 may, in some implementations, obtain a θ value and a φ value from the first data structure based on the first error code, wherein the θ value is a real number between 0 and π and the φ value is a real number between 0 and 2π, and calculate the first qubit state based on the θ value and the φ value. The means 804 may be implemented in any number of manners, including, for example via the error code mapper 704 illustrated in FIG. 7.

The quantum computing device 10-2 also includes a means 806 for sending a response comprising the first qubit state. The means 806 may be implemented in any number of manners, including, for example via the response sender 706 illustrated in FIG. 7.

Figure 9:
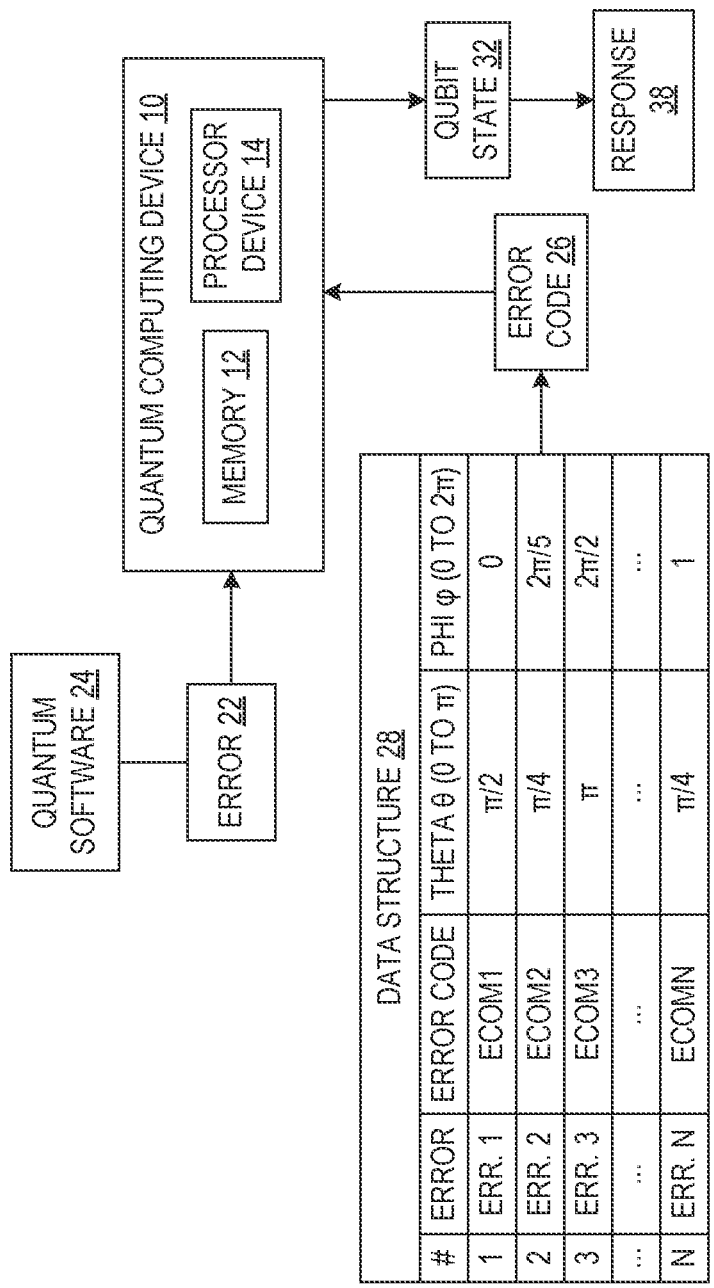
FIG. 9 is a block diagram of the quantum computing device of FIG. 1 for mapping an error code to a qubit, according to one example.

FIG. 9 is a block diagram of the quantum computing device of FIG. 1 for mapping an error code to a qubit, according to one example. Elements of FIG. 1 are referenced in describing FIG. 9 for the sake of clarity. In the example of FIG. 9, a quantum computing device 10 comprises a system memory 12 and a processor device 14 coupled to the system memory 12. The processor device 14 is to determine that a first error 22 occurred during an execution of quantum software 24. The processor device 14 is further to obtain, based on the first error 22, a first error code 26 from a first data structure 28 comprising error codes associated with the quantum software 24 and errors that occur with the quantum software 24. The processor device 14 is further to map the first error code 26 to a first qubit state 32. The processor device 14 is further to send a response 38 comprising the first qubit state 32.

Figure 10:
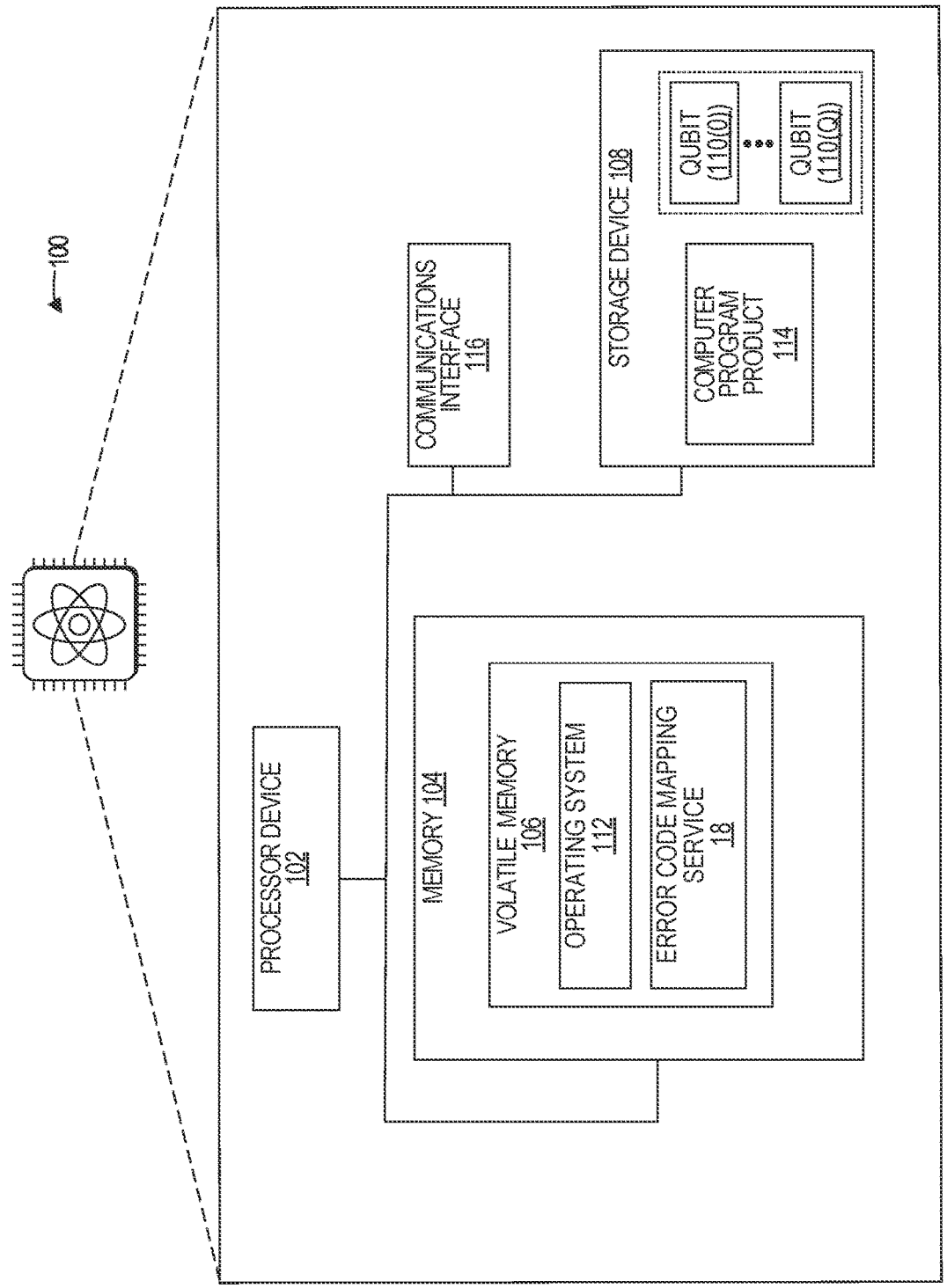
FIG. 10 is a block diagram of a quantum computing device suitable for implementing examples, according to one example.

FIG. 10 is a block diagram of a quantum computing device 100, such as the quantum computing device 10 of FIG. 1, suitable for implementing examples, according to one example. The quantum computing device 100 may comprise any suitable quantum computing device or devices. The quantum computing device 100 can operate using classical computing principles or quantum computing principles. Thus, in some implementations, portions of the quantum computing device 100 (e.g., the error code mapping service 18) may be executed using classical computing components and/or algorithms. When using quantum computing principles, the quantum computing device 100 performs computations that utilize quantum-mechanical phenomena, such as superposition and entanglement. The quantum computing device 100 may operate under certain environmental conditions, such as at or near zero degrees) (0° Kelvin. When using classical computing principles, the quantum computing device 100 utilizes binary digits that have a value of either zero (0) or one (1).

The quantum computing device 100 includes a processor device 102, such as the processor device 14, and a system memory 104, such as the system memory 12. The processor device 102 can be any commercially available or proprietary processor suitable for operating in a quantum environment. The system memory 104 may include volatile memory 106 (e.g., random-access memory (RAM)).

The quantum computing device 100 may further include or be coupled to a non-transitory computer-readable medium such as a storage device 108, such as the storage device 16. The storage device 108 may comprise, for example, an internal or external hard disk drive (HDD) (e.g., enhanced integrated drive electronics (EIDE) or serial advanced technology attachment (SATA)) for storage, memory, or the like. The storage device 108 and other drives associated with computer-readable media and computer-usable media may provide non-volatile storage of data, data structures, computer-executable instructions, and the like. The storage device may also provide functionality for storing one or more qubits 110(0)-110(Q), such as the one or more qubits 20(0)-20(Q).

A number of modules can be stored in the storage device 108 and in the volatile memory 106, including an operating system 112 and one or more modules, such as the error code mapping service 18. All or a portion of the examples may be implemented as a computer program product 114 stored on a transitory or non-transitory computer-usable or computer-readable medium, such as the storage device 108, which includes complex programming instructions, such as complex computer-readable program code, to cause the processor device 102 to carry out the steps described herein. Thus, the computer-readable program code can comprise computer-executable instructions for implementing the functionality of the examples described herein when executed on the processor device 102.

An operator may also be able to enter one or more configuration commands through a keyboard (not illustrated), a pointing device such as a mouse (not illustrated), or a touch-sensitive surface such as a display device (not illustrated). The quantum computing device 100 may also include a communications interface 116 suitable for communicating with other quantum computing systems, including, in some implementations, classical computing devices.

Other computer system designs and configurations may also be suitable to implement the systems and methods described herein. The following examples illustrate various implementations in accordance with one or more aspects of the disclosure.

Example 1 is a method comprising determining, by a quantum computing device, that an operating system error occurred during an execution of a quantum operating system; obtaining, by the quantum computing device based on an operating system error code associated with the operating system error, a θ value and a φ value from a data structure comprising operating system error codes associated with the quantum operating system and errors that occur with the quantum operating system; mapping, by the quantum computing device based on the θ value and the φ value, the operating system error code to a qubit state; and sending, by the quantum computing device, a response comprising the qubit state.

Example 2 is the method of example 1, wherein determining that the operating system error occurred during an execution of the quantum operating system comprises: receiving the operating system error code from the quantum operating system.

Example 3 is the method of example 1, wherein obtaining, based on the operating system error code associated with the error, the θ value and the φ value from the data structure comprises: querying the data structure with the operating system error code; and receiving the θ value and the φ value from the data structure based on the query with the operating system error code.

Example 4 is the method of example 1, wherein mapping, based on the θ value and the φ value, the operating system error code to a qubit state comprises: calculating the qubit state based on the θ value and the φ value, wherein the qubit state is represented by $\cos\theta/2|0\rangle + e^{i\phi}\sin\theta/2|1\rangle$.

Example 5 is the method of example 1, wherein the θ value is a real number between 0 and π and the φ value is a real number between 0 and 2π.

Example 6 is the method of example 1, wherein the response comprises a single qubit.

Example 7 is a quantum computing device that includes a memory and a processor device coupled to the memory. The processor device is to determine that an operating system error occurred during an execution of a quantum operating system; obtain, based on an operating system error code associated with the operating system error, a θ value and a φ value from a data structure comprising operating system error codes associated with the quantum operating system and errors that occur with the quantum operating system; map, based on the θ value and the φ value, the operating system error code to a qubit state; and send a response comprising the qubit state.

Example 8 is the quantum computing device of example 7, wherein to determine that the operating system error occurred during an execution of the quantum operating system, the processor device is further to: receive the operating system error code from the quantum operating system.

Example 9 is the quantum computing device of example 7, wherein to obtain, based on the operating system error code associated with the error, the θ value and the φ value from the data structure, the processor device is further to: query the data structure with the operating system error code; and receive the θ value and the φ value from the data structure based on the query with the operating system error code.

Example 10 is the quantum computing device of example 7, wherein to map, based on the θ value and the φ value, the operating system error code to a qubit state, the processor device is further to: calculate the qubit state based on the θ value and the φ value, wherein the qubit state is represented by $\cos \theta/2|0\rangle + e^{i\phi} \sin \theta/2|1\rangle$.

Example 11 is the quantum computing device of example 7, wherein the θ value is a real number between 0 and π and the φ value is a real number between 0 and 2π.

Example 12 is the quantum computing device of example 7, wherein the response comprises a single qubit.

Example 13 is a non-transitory computer-readable storage medium that includes computer-executable instructions that, when executed, cause one or more processor devices to determine that an operating system error occurred during an execution of a quantum operating system; obtain, based on an operating system error code associated with the operating system error, a θ value and a φ value from a data structure comprising operating system error codes associated with the quantum operating system and errors that occur with the quantum operating system; map, based on the θ value and the φ value, the operating system error code to a qubit state; and send a response comprising the qubit state.

Example 14 is the non-transitory computer-readable storage medium of example 13, wherein to determine that the operating system error occurred during an execution of the quantum operating system, the instructions are further to cause the processor device to: receive the operating system error code from the quantum operating system.

Example 15 is the non-transitory computer-readable storage medium of example 13, wherein to obtain, based on the operating system error code associated with the error, the θ value and the φ value from the data structure, the instructions are further to cause the processor device to: query the data structure with the operating system error code; and receive the θ value and the φ value from the data structure based on the query with the operating system error code.

Example 16 is the non-transitory computer-readable storage medium of example 13, wherein to map, based on the θ value and the φ value, the operating system error code to a qubit state, the instructions are further to cause the processor device to: calculate the qubit state based on the θ value and the φ value, wherein the qubit state is represented by $\cos \theta/2|0\rangle + e^{i\phi} \sin \theta/2|1\rangle$.

Example 17 is the non-transitory computer-readable storage medium of example 13, wherein the θ value is a real number between 0 and π and the φ value is a real number between 0 and 2π.

Example 18 is the non-transitory computer-readable storage medium of example 13, wherein the response comprises a single qubit.

Example 19 is a quantum computing device including an error determiner to determine that an operating system error occurred during an execution of a quantum operating system, an error code retriever to obtain, based on an operating system error code associated with the operating system error, a θ value and a φ value from a data structure comprising operating system error codes associated with the quantum operating system and errors that occur with the quantum operating system, an error code mapper to map, based on the θ value and the φ value, the operating system error code to a qubit state, and a response sender to send a response comprising the qubit state.

Example 20 is a quantum computing device including a means for determining that an operating system error occurred during an execution of a quantum operating system, a means for obtaining, based on an operating system error code associated with the operating system error, a θ value and a φ value from a data structure comprising operating system error codes associated with the quantum operating system and errors that occur with the quantum operating system, a means for mapping, based on the θ value and the φ value, the operating system error code to a qubit state, and a means for sending a response comprising the qubit state.

Individuals will recognize improvements and modifications to the preferred examples of the disclosure. All such improvements and modifications are considered within the scope of the concepts disclosed herein and the claims that follow.

What is claimed is:

1. A method, comprising:
   determining, by a quantum computing device, that a first error occurred during an execution of quantum software;
   obtaining, by the quantum computing device based on the first error, a first error code from a first data structure comprising a first plurality of error codes for the quantum software, wherein the first plurality of error codes is associated with a first plurality of errors that can occur with the quantum software, wherein the first plurality of errors comprises the first error, and wherein the first data structure associates the first error with the first error code;
   mapping, by the quantum computing device, the first error code to a first qubit state; and
   sending, by the quantum computing device, a response comprising the first qubit state.

2. The method of claim 1, further comprising:
   determining that a second error occurred during an execution of the quantum software;
   obtaining, based on the second error, a second error code from the first data structure, wherein the second error code is different from the first error code;
   mapping the second error code to a second qubit state; and
   sending a response comprising the second qubit state, wherein the second qubit state is different from the first qubit state.

3. The method of claim 1, further comprising:
   determining that a second error occurred during an execution of the quantum software;
   obtaining, based on the second error, a second error code from the first data structure, wherein the second error code is identical to the first error code;
   mapping the second error code to a second qubit state; and
   sending a response comprising the second qubit state, wherein the second qubit state is identical to the first qubit state.

4. The method of claim 1, wherein determining that the first error occurred during the execution of the quantum software comprises:
   receiving the first error code from the quantum software.

5. The method of claim 1, wherein obtaining, based on the first error, the first error code from the first data structure comprises:
   obtaining the first error that occurred during the execution of the quantum software;
   querying the first data structure with the first error; and
   receiving the first error code from the first data structure based on the query with the first error.

6. The method of claim 1, wherein mapping the first error code to a first qubit state comprises:
obtaining a θ value and a φ value from the first data structure based on the first error code, wherein the θ value is a real number between 0 and π and the φ value is a real number between 0 and 2π; and
calculating the first qubit state based on the θ value and the φ value.

7. The method of claim 1, further comprising:
determining that the quantum software has been updated to a new version of the quantum software, wherein the new version of the quantum software comprises a second data structure comprising a second plurality of error codes for the new version of the quantum software, wherein the second plurality of error codes is associated with a second plurality of errors that can occur with the new version of the quantum software.

8. The method of claim 7, further comprising:
determining that an error occurred during an execution of the new version of the quantum software;
obtaining, based on the error, an error code from the second data structure;
mapping the error code to a qubit state; and
sending a response comprising the qubit state.

9. The method of claim 8, wherein obtaining, based on the error, the error code from the second data structure comprises:
obtaining the error that occurred during the execution of the new version of the quantum software;
querying the second data structure with the error; and
receiving the error code from the second data structure based on the query with the error.

10. The method of claim 8, wherein mapping the error code to the qubit state comprises:
obtaining a θ value and a φ value from the second data structure based on the error code, wherein the θ value is a real number between 0 and π and the φ value is a real number between 0 and 2π; and
calculating the qubit state based on the θ value and the φ value.

11. The method of claim 1, wherein the response comprises a single qubit.

12. The method of claim 1, wherein the first data structure is packaged with the quantum software.

13. The method of claim 1, wherein the first qubit state is represented by $\cos[(\theta/2|)]|{-}0\rangle + e^{i\phi}\sin[(\theta/2)]|{-}1\rangle$, where $\theta, \phi \in \mathbb{R}$ and $\theta \in [0, \pi], \phi \in [0, 2\pi]$.

14. A quantum computing device, comprising:
a system memory; and
a processor device communicatively coupled to the system memory, the processor device to:
determine that a first error occurred during an execution of quantum software;
obtain, based on the first error, a first error code from a first data structure comprising a first plurality of error codes for the quantum software, wherein the first plurality of error codes are associated with a first plurality of errors that can occur with the quantum software, wherein the first plurality of errors comprises the first error, and wherein the first data structure associates the first error with the first error code;
map the first error code to a first qubit state; and
send a response comprising the first qubit state.

15. The quantum computing device of claim 14, wherein the processor device is further to:
determine that a second error occurred during an execution of the quantum software;
obtain, based on the second error, a second error code from the first data structure, wherein the second error code is different from the first error code;
map the second error code to a second qubit state; and
send a response comprising the second qubit state, wherein the second qubit state is different from the first qubit state.

16. The quantum computing device of claim 14, wherein the processor device is further to:
determine that a second error occurred during an execution of the quantum software;
obtain, based on the second error, a second error code from the first data structure, wherein the second error code is identical to the first error code;
map the second error code to a second qubit state; and
send a response comprising the second qubit state, wherein the second qubit state is identical to the first qubit state.

17. The quantum computing device of claim 14, wherein, to obtain, based on the first error, the first error code from the first data structure, the processor device is further to:
obtain the first error that occurred during the execution of the quantum software;
query the first data structure with the first error; and
receive the first error code from the first data structure based on the query with the first error.

18. The quantum computing device of claim 14, wherein, to map the first error code to the first qubit state, the processor device is further to:
obtain a θ value and a φ value from the first data structure based on the first error code, wherein the θ value is a real number between 0 and π and the φ value is a real number between 0 and 2π; and
calculate the first qubit state based on the θ value and the φ value.

19. The quantum computing device of claim 14, wherein the response comprises a single qubit.

20. A non-transitory computer-readable storage medium that includes computer-executable instructions that, when executed, cause one or more processor devices to:
determine that a first error occurred during an execution of quantum software;
obtain, based on the first error, a first error code from a first data structure comprising a first plurality of error codes for the quantum software, wherein the first plurality of error codes is associated with a first plurality of errors that can occur with the quantum software, wherein the first plurality of errors comprises the first error, and wherein the first data structure associates the first error with the first error code;
map the first error code to a first qubit state; and
send a response comprising the first qubit state.

* * * * *